UNITED STATES PATENT OFFICE.

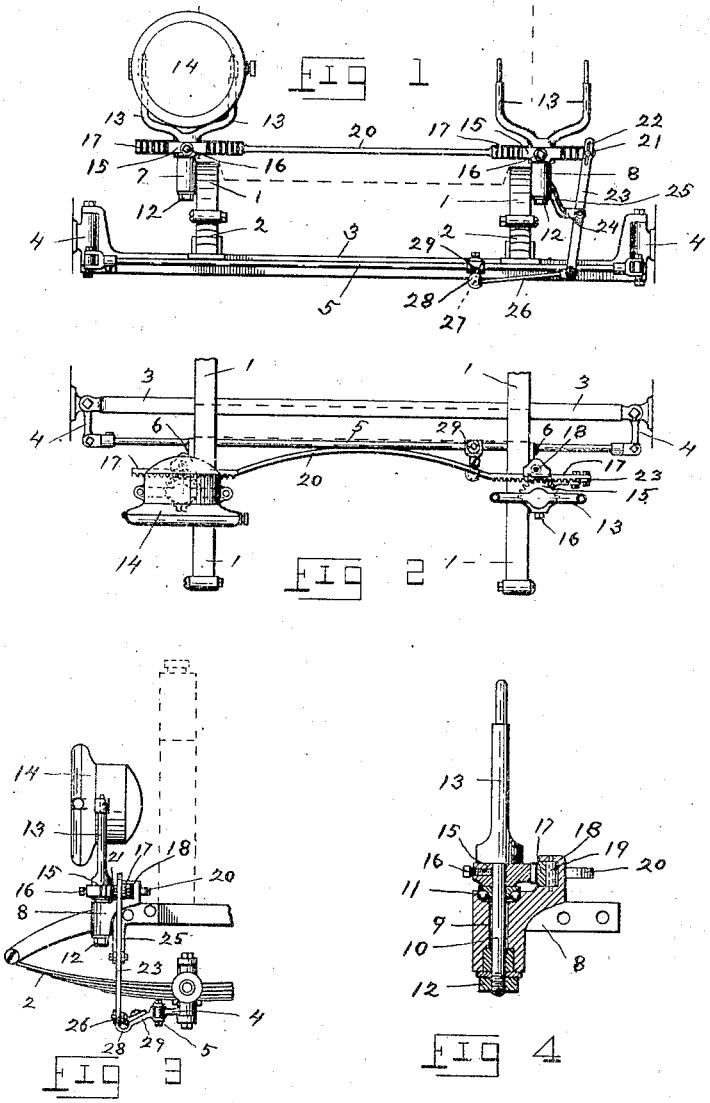

EDGAR H. PLANK AND DAVID A. GROFF, OF LAMPETER, PENNSYLVANIA.

AUTOMOBILE HEADLIGHT-ADJUSTER.

1,002,540.  Specification of Letters Patent.  Patented Sept. 5, 1911.

Application filed January 16, 1911. Serial No. 602,835.

*To all whom it may concern:*

Be it known that we, EDGAR H. PLANK and DAVID A. GROFF, citizens of the United States, residing at Lampeter, in the county of Lancaster and State of Pennsylvania, have invented certain new and useful Improvements in Automobile Headlight-Adjusters, of which the following is a specification, reference being had therein to the accompanying drawing.

Our invention relates to an improvement in an operating mechanism for automatically swiveling automobile headlights, for use in rounding curves in the road to swivel the lamps so as to direct the rays of light to correspond to the direction taken by the steering wheels of the vehicle.

The objects of the invention are to provide a device of this kind that shall be cheap, effective and durable.

Another object being to construct a device of this class that shall be adaptable to all of the different makes of automobiles, and further, that it may be easily adapted and attached thereto.

Still another object of the invention is to provide means for compensating for the spring compression, twist, and side movement of the vehicle and prevent the vibration of the lamps.

With these and other objects in view, our invention consists in certain construction and combination of parts as will hereinafter be fully described and claimed and illustrated in the accompanying drawings which form a part of this application, and in which like figures of reference refer to corresponding parts in all of the views; but it is fully understood that while we have here described our invention as shown, that we do not confine ourselves to the exact design, as slight changes may be made in the construction and arrangement of the several parts without departing from the spirit of the invention.

In the drawings:—Figure 1, is a front elevation of the device as applied to an automobile. Fig. 2, is a top plan view of the same. Fig. 3, is a side elevation of the same. Fig. 4, is a detail vertical sectional view of the spindle and bracket.

Referring to the drawings:—The usual side frames of the auto are designated by the numeral 1, to the ends of which are pivoted the forward ends of the semi-elliptic springs 2, in the usual way. Said springs 2, are mounted on the axle 3, which is provided with the steering knuckles 4, connected by the steering rod 5, which is operated in the usual way.

To the side frames 1, of the vehicle, are secured by the bolts 6, the lamp brackets 7, and 8, which are provided with the vertical bearings 9, within which are mounted the spindles 10, which swivel upon the ball bearings 11, and are retained by the nut 12, threaded upon the lower end thereof; while to the upper ends of said spindles 10, are secured the usual lamp forks 13, for holding the lamps 14. Upon said spindles 10, above the ball bearings 11, are secured the gear segments 15, by the set screws 16. The teeth of said gear segments 15, are in mesh with the teeth on the racks 17, which are mounted in slide bearings 18, formed in the brackets 7, and 8; said racks 17, sliding against the rollers 19, mounted in said slide bearing 18. The inner ends of the racks 17, are joined by a curved rod 20, which extends across in front of the radiator of the vehicle. The outer end of one of said racks 17, is provided with a projecting stud 21, which is engaged by a slot 22, formed in the upper end of a swinging arm 23, which is pivoted by the pin 24, to a supporting arm 25, extending from the rear of the bracket 8. To the lower end of said arm 23, is pivoted one end of a link 26; the other end of said link 26, is formed with a ball 27, which is engaged by a ball-socket 28, formed on the outer end of an arm 29, which is clamped to the steering rod 5, of the vehicle.

It will thus be readily seen that as the steering wheels of the vehicle are actuated by the steering gear and the direction of the vehicle is changed, the steering rod 5, by the action of the arm 29, and link 26, will swing the pivoted swinging rod 23, which in turn will reciprocate the racks 17, and thus by the gear segments 15, the lamp forks 13, and lamps 14, will be turned in the same direction as the vehicle is turned to project the light in the path of the vehicle.

Having thus described our invention what we claim as new and desire to secure by Letters Patent is:—

In an automatic headlight adjuster of the class described, the combination with a bracket member secured to the vehicle frame and provided with a vertical spindle bearing in the body thereof, and a lamp supporting spindle rotatably mounted therein, of a gear segment secured to said spindle, a rack guide formed in said bracket member, a rack slidably mounted in said guide and in mesh with said gear segment, a roller mounted in said guide in rolling contact with said rack, an arm extending from the side of said bracket member, a swinging arm pivoted to said extending arm, the upper end of said swinging arm adjustably secured to one end of said rack, an arm rigidly secured to the steering rod of the vehicle, and a link connecting said arm to the lower end of the swinging arm in such a manner as to compensate for the spring compression and twist of the vehicle gear.

In testimony whereof we affix our signatures in presence of two witnesses.

EDGAR H. PLANK.
DAVID A. GROFF.

Witnesses:
WM. J. COULTER,
MABEL L. LEFEVRE.